United States Patent
Ross et al.

(10) Patent No.: US 10,666,623 B2
(45) Date of Patent: \*May 26, 2020

(54) WIRED COMMUNICATIONS SYSTEMS WITH IMPROVED CAPACITY AND SECURITY

(71) Applicant: General Electric Company, Schenectady, NY (US)

(72) Inventors: John Anderson Fergus Ross, Niskayuna, NY (US); Michael James Hartman, Clifton Park, NY (US); John Erik Hershey, Ballston Lake, NY (US); Richard Louis Zinser, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 586 days.

This patent is subject to a terminal disclaimer.

(21) Appl. No.: 14/299,390

(22) Filed: Jun. 9, 2014

(65) Prior Publication Data
US 2014/0286489 A1 Sep. 25, 2014

Related U.S. Application Data

(63) Continuation of application No. 13/277,126, filed on Oct. 19, 2011, now Pat. No. 8,787,571.

(51) Int. Cl.
*H04L 29/06* (2006.01)
*H04L 5/14* (2006.01)
*H04L 1/00* (2006.01)

(52) U.S. Cl.
CPC ........ *H04L 63/0428* (2013.01); *H04L 1/0045* (2013.01); *H04L 5/14* (2013.01)

(58) Field of Classification Search
CPC ...... H04L 63/0428; H04L 1/0045; H04L 5/14
See application file for complete search history.

(56) References Cited

U.S. PATENT DOCUMENTS

| | | | |
|---|---|---|---|
| 5,012,519 A * | 4/1991 | Adlersberg | ......... G10L 21/0208 704/225 |
| 5,231,628 A | 7/1993 | Boman | |
| (Continued) | | | |

FOREIGN PATENT DOCUMENTS

| | | |
|---|---|---|
| EP | 1705824 A2 | 9/2005 |
| JP | 2209034 A | 8/1990 |
| (Continued) | | |

OTHER PUBLICATIONS

S. Chen, Division-free duplex for wireless applications, Jan. 22, 1998, vol. 34, No. 2.*

(Continued)

*Primary Examiner* — Khoi V Le
(74) *Attorney, Agent, or Firm* — Fletcher Yoder P.C.

(57) ABSTRACT

Provided are methods and systems of using division-free duplexing (DFD) in a cable communication network. Techniques for applying DFD in a cable communication network may enable data to be transmitted and received over a coaxial cable without using division duplexing techniques. For example, the cable communication network may include DFD enabled network nodes and each subscriber to the cable network may be equipped with a DFD system configured to operate in a DFD mode. In some embodiments, oppositely propagating signals may be transmitted over one frequency channel, and DFD techniques may be used to recover originally transmitted signals. Further, in some embodiments, DFD techniques may be used with encryption methods to increase the security of data transmitted in the cable communication network.

28 Claims, 3 Drawing Sheets

(56) References Cited

U.S. PATENT DOCUMENTS

| | | | |
|---|---|---|---|
| 5,787,180 A | 7/1998 | Hall et al. | |
| 6,006,175 A * | 12/1999 | Holzrichter | A61B 5/0507 704/205 |
| 6,337,884 B1 * | 1/2002 | Cao | G06F 13/4072 375/257 |
| 6,370,245 B1 | 4/2002 | White | |
| 6,625,206 B1 * | 9/2003 | Doblar | H04L 5/1476 375/219 |
| 7,082,157 B2 * | 7/2006 | Lin | H04L 5/1423 370/289 |
| 7,096,042 B2 * | 8/2006 | Marinier | H01Q 3/2611 370/279 |
| 7,269,211 B2 | 9/2007 | Lin et al. | |
| 7,324,467 B2 | 1/2008 | Fleischhacker | |
| 7,349,678 B2 * | 3/2008 | Salfelner | H04B 1/56 330/5 |
| 7,715,561 B2 | 5/2010 | Song | |
| 2003/0012372 A1 * | 1/2003 | Cheng | H03M 13/2957 380/28 |
| 2003/0223579 A1 * | 12/2003 | Kanter | H04L 9/304 380/28 |
| 2004/0201850 A1 * | 10/2004 | Hajian | G01J 3/453 356/451 |
| 2007/0177679 A1 * | 8/2007 | Sovenyi | H04L 12/407 375/257 |
| 2007/0293142 A1 | 12/2007 | Dehmas et al. | |
| 2008/0107046 A1 * | 5/2008 | Kangasmaa | H04B 1/525 370/278 |
| 2008/0237346 A1 | 10/2008 | Savry et al. | |
| 2009/0103688 A1 | 4/2009 | Cabelli | |
| 2009/0110030 A1 * | 4/2009 | Kennedy | H04B 1/71635 375/130 |
| 2009/0125351 A1 * | 5/2009 | Davis, Jr. | G06Q 20/027 705/79 |
| 2010/0150032 A1 | 6/2010 | Zinser et al. | |
| 2011/0081872 A1 * | 4/2011 | Bar-Sade | H04L 12/46 455/77 |
| 2011/0085473 A1 * | 4/2011 | Nakajima | H04N 5/775 370/254 |
| 2011/0249596 A1 | 10/2011 | Ross et al. | |
| 2011/0255448 A1 | 10/2011 | Hartman et al. | |

FOREIGN PATENT DOCUMENTS

| | | |
|---|---|---|
| JP | 2008515261 A | 5/2008 |
| JP | 2008243207 A | 10/2008 |

OTHER PUBLICATIONS

Chen et al.; Division-Free Duplex for Wireless Applications; Electronic Letters; Jan. 22, 1998, vol. 34, No. 2.

Verhoeckx, N., Digital echo cancellation for baseband data transmission, Acoustics, Speech and Signal Processing, IEEE Transactions on, Dec. 1979, pp. 768-781, vol. 27, Issue 6.

Momona et al., "Technologies and Standardization Activities in Cable TV Access Networks", The Institute of Electronics Information and Communication Engineers, vol. No. 98, Issue No. 589, pp. 57-64, 1999.

Unofficial English Translation of Japanese Office Action issued in connection with corresponding JP Application No. 2012224644 dated Aug. 23, 2016.

* cited by examiner

WIRED COMMUNICATIONS SYSTEMS WITH IMPROVED CAPACITY AND SECURITY

CROSS-REFERENCE TO RELATED APPLICATION

This application is a continuation of application Ser. No. 13/277,176, filed Oct. 19, 2011, entitled "WIRED COMMUNICATIONS SYSTEMS WITH IMPROVED CAPACITY AND SECURITY", in the name of John Anderson Fergus Ross, Michael James Hartman, John Erik Hershey and Richard Louis Zinser and assigned to General Electric Company, which is incorporated herein by reference in its entirety.

BACKGROUND

The subject matter disclosed herein relates to communication systems, and more particularly, to systems and methods of conducting a communication using division free duplexing.

A communication network may include multiple communication devices capable of communicating through various communication routes. Depending on the configuration of the network, communication routes may be made from one communication device to another via central network nodes which connect the devices, or communication routes may include links between any devices of the network. For example, a cable communication network may include one or more subnetworks of fiber rings having a coaxial cable shared between multiple users connected in the fiber ring. Each fiber ring may support a neighborhood of houses, for example, and devices in each of the connected houses may communicate via the shared coaxial cable with a central network node (e.g., an internet access point, cable television provider, etc).

Generally, the coaxial cable connecting each user to another user or to a network node may involve the bidirectional transmission of signals. To avoid direct interference between oppositely propagating signals, duplexing techniques may typically be employed. Duplexing techniques may include time-division, frequency-division, and/or code-division duplexing to allow two communicating devices to both transmit and receive information (e.g., data, voice signals, etc.). For example, time-division duplexing may use time-division multiplexing to separate incoming (received) and outgoing (transmitted) signals in time. The time-division of the signals may be sufficiently fast such that signals may be perceived as being transmitted and received simultaneously. Frequency-division duplexing may involve signal transmitters and receivers which operate on different frequencies. The frequencies of the transmitted and received signals may be sufficiently separated such that their modulated frequency spectra do not overlap, and the receiver of each communication device may be tuned to simultaneously receive an intended frequency and reject its own transmitted signal. Code-division duplexing may involve encoding transmitted signals with codes such that certain signals may be separated from other signals when received at a receiving end of the communication.

Although division duplex systems may enable the near-simultaneous transmitting and receiving of signals, such systems may be insufficient for some communication networks, which have become increasingly complex. For example, networks using time-division duplex systems may lose time in receiving the signals due to the time-multiplexing of signals, and networks using frequency-division duplex systems may have a limited amount of frequency spectra available for transmission links which support an increasingly large number of communication devices. Moreover, data security is a common concern for cable communication networks, and typical duplex systems may be insufficient for addressing such concerns.

BRIEF DESCRIPTION

In one embodiment, a method of managing a communication in a communication network is provided. The method includes transmitting data from a first device in a first direction over a cable in a cable communication network and transmitting data from a second device in a second direction opposite the first direction over the cable. The data transmitted in the first direction and the data transmitted in the second direction are transmitted substantially simultaneously, using a division-free duplexing (DFD) technique.

Another embodiment provides a cable communication system including a plurality of nodes. Each of the plurality of nodes include a division-free duplexing (DFD) system configured such that each of the plurality of nodes is operable in a DFD mode. The cable communication system further includes a processor configured to control a mode of operation of each of the plurality of nodes.

Yet another embodiment provides a division-free duplexing (DFD) system including a receiver capable of receiving an analog primary signal from a coaxial cable in a cable network and a transmitter capable of transmitting an analog transmitted signal to the coaxial cable. The DFD system includes a directional coupler capable of sampling a portion of the analog transmitted signal to provide an analog reference signal. The DFD system also includes a first analog to digital converter capable of converting the analog primary signal into a digital primary signal and a second analog to digital converter capable of converting the analog reference signal into a digital reference signal. Furthermore the DFD system includes a processor having instructions for processing the digital reference signal with an adaptive filter which uses the digital reference and primary signals as inputs for determining filter weights of the adaptive filter to provide an output. The processor also includes instructions for subtracting the output of the adaptive filter from the digital primary signal to generate a digital cancelled signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

A communication network may include multiple interconnected devices capable transmitting and/or receiving signals. Communication networks may have various types of configurations which connect one device to another. For example, a cable communication network may include one or more subnetworks of fiber rings having a cable (e.g., coaxial cable) shared between multiple users connected in each fiber ring. Each fiber ring may support a neighborhood of houses, for example, and the connected devices in each of the connected houses may communicate via the shared coaxial cable. Data may be transmitted and received over the shared coaxial cable between the connected devices and a central network node (e.g., an internet access point, cable television provider, etc.).

Figure 1:
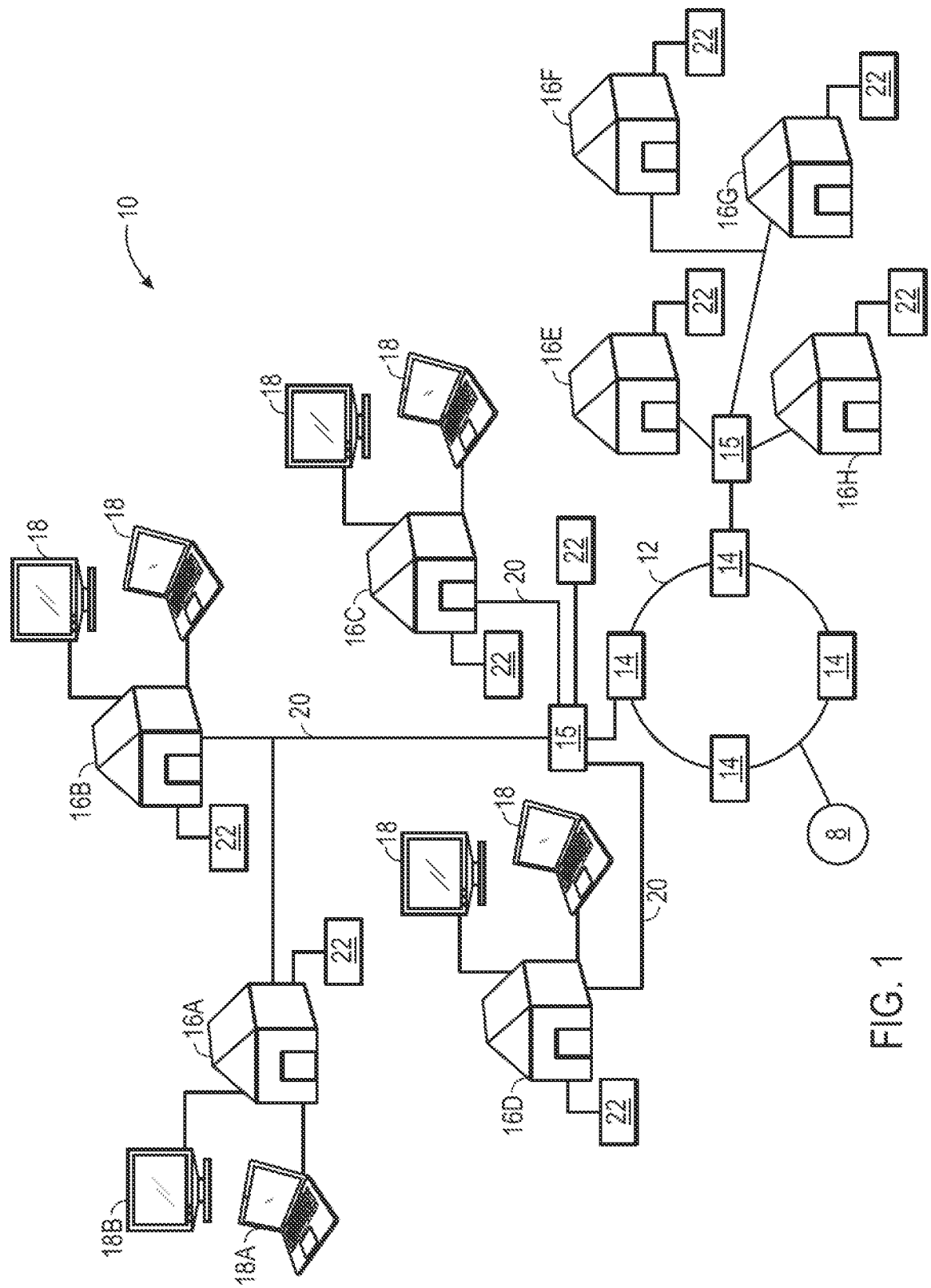
FIG. 1 is an example of a portion of a cable communication network connected to a fiber ring, in accordance with embodiments of the present techniques.

FIG. 1 is an illustration of one configuration of a communication network 10 having a fiber ring 12 connected to a central network node 8. The fiber ring 12 may connect multiple fiber hubs 14 configured to communicate with one another and/or communicate with the central network node 8. In some embodiments, each of the fiber hubs 14 may connect through a fiber node 15. Each fiber node 15 may connect a neighborhood of houses 16 (e.g., houses 16a-16d) over a coaxial cable 20, and each house 16 may have one or more users 18 (e.g., one user on a laptop 18a and one user on a desktop 18b). Data may be communicated within the network 10 over the fiber ring 12 and the coaxial cable 20. The coaxial cable 20 may be configured for bidirectional transmission of data. Bidirectional data transmission may refer to the substantially simultaneous transfer of data in opposite directions. For example, data may be transmitted in a direction from the houses to the fiber node 15 and from the fiber node 15 to the houses 16.

As the coaxial cable 20 is bidirectional, a device 18 or the devices 18a and 18b in a house 16a may be able to send and receive data substantially simultaneously. Generally, transmitting bidirectional signals substantially simultaneously may involve techniques for avoiding direct interference between oppositely propagating signals. Such techniques, also referred to as duplexing techniques, may include time-division, frequency-division, and/or code-division duplexing to allow two communicating devices to both transmit and receive information. However, although division duplex techniques may enable a near-simultaneous two-way communication route, such division duplex systems may be insufficient to address various problems in typical cable communication systems.

As cable communication networks have increased in size and complexity, certain issues such as bandwidth and security may become increasingly important. For example, a cable communication system which includes many users in a large neighborhood may result in increased bandwidth consumption. Using the network 10 as an example, signals which are transmitted to and from the houses 16 through the network node 15 may use more bandwidth as the houses 16 connected to each network node 15 are increased and/or as more network nodes 15 connecting neighborhoods of houses 16 are connected to the network hub 14. For example, if frequency-division duplexing techniques are used to transmit signals between the network node 15 and the houses 16, each house 16 may use two separate frequency channels, where one channel may be used for receiving signals, and one channel may be used for transmitting signals. The addition of houses 16 and/or devices 18 in the houses 16 may further increase the number of frequency channels used to support the two-way communication between the houses 16 and the network node 15. Beyond a certain number of connected houses 16, the number of available frequency channels in a given frequency spectrum may become limited.

Furthermore, security concerns may also result from the increasing complexity of cable communication networks. As all signals transmitted between each of the connected houses 16 are transmitted over the shared coaxial cable 20 through the network node 15, a user in the network 10 may have access to all waveform signals which are transmitted through a particular portion of the coaxial cable 20. For example, an interceptor may be able to access the signals transmitted from and received by each of the houses 16 by intercepting a portion of the coaxial cable 20. Separating such signals to determine the original content may be possible if the signals are transmitted and received using typical division duplexing techniques. For instance, if frequency-division duplexing techniques are used, an interceptor may be able to relatively easily access signals which are transmitted on each or any individual frequency channel and determine the original content of such transmitted signals.

The present techniques involve using division-free duplexing in cable communication networks which may address bandwidth and/or security issues. Division-free duplexing may enable two devices in a cable network to transmit and receive signals over the same frequency and during the same time by reducing interference resulting from the oppositely propagating signals. Moreover, implementing division-free duplexing in a cable network involves simultaneously transmitting signals in opposite directions over the same conductor, and using the same spectrum space. In some embodiments, signal interference between oppositely propagating transmitted and received signals traveling over a cable in one frequency channel may result in a received signal which includes an interference component that is representative of the transmitted signal. During normal operation, the receiver input port will contain two signal components: a strong transmitted signal, and a significantly weaker received signal. Simple subtraction of the transmitted signal at the receiver end is generally insufficient to eliminate this interference, as the version of the transmitted signal that is received has usually undergone some distortion. The received copy of the transmitted signal may be "corrupted" by effects such as multipath reflected images of the original signal, phase distortion and amplitude changes, and/or delay. Accordingly, a simple subtraction may not account for the type and magnitude of the changes in the transmitted signal interference component of the received signal.

Implementing division-free duplexing techniques in cable communication systems may account for the changes in signals received at the receiver input port. In some embodiments, a software-based adaptive filter may be implemented on one or more devices in a network to time and phase-align the "clean" transmitted signal sampled at a transmitter input port of a device to a "corrupted" version present at the receiver input port. Such techniques may be implemented by high-speed analog-to-digital (A/D) converters and software-controlled digital signal processors. For instance, by using two 14-bit converters and a single loop adaptive filter algorithm, narrowband incoming signals that are below the level of the transmitted signal may be decoded.

Figure 2:
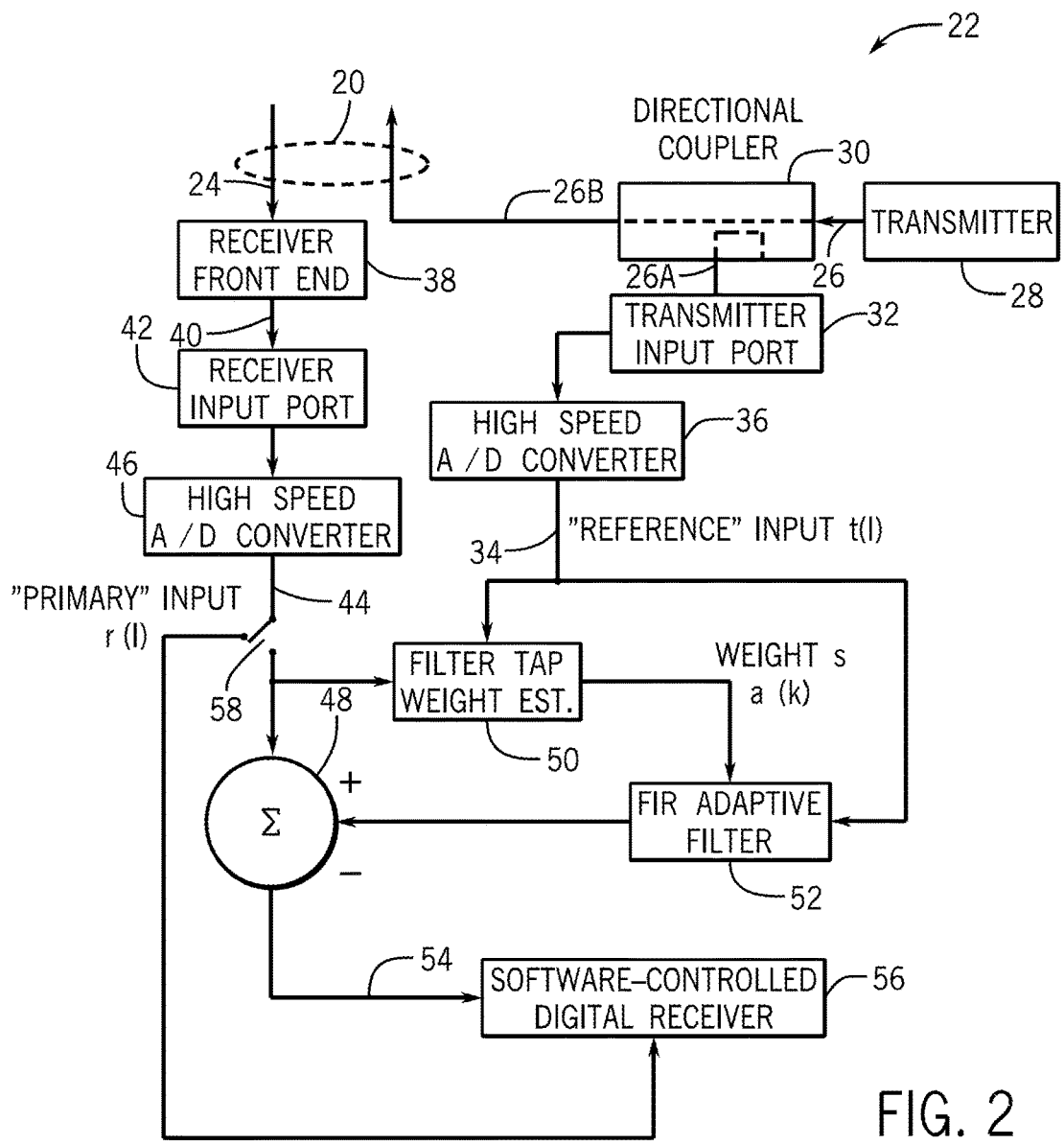
FIG. 2 is an example of a division-free duplexing system suitable for use with the cable communication network illustrated in FIG. 1, in accordance with embodiments of the present techniques.

An example of a division-free duplexing (DFD) system which may be implemented in a cable communication network 10 is illustrated in FIG. 2. The DFD system 22 may be implemented at each house 16 and/or each network node 15 in a cable communication network 10. The coaxial cable 20 connecting each of the houses 16 in the network 10 may transmit to and receive from the DFD system 22. In the transmitter portion of the system 22, a portion of the signal 26 from a transmit source (transmitter 28) is input to a directional coupler 30 to produce an attenuated signal 26a representative of the transmitted signal 26, while the bulk of the signal 26b is output to the cable 20. The attenuated signal 26a is input to a transmitter input port 32 and is converted to a digital signal 34 by an A/D converter 36.

In the receiver portion of the system, an incoming signal 24 may be received at a receiver front end 38 to produce a received signal 40. The receiver front end 38 may include analog amplifiers and/or filters, such as a wideband buffer amplifier. The received signal 40 may be input to a receiver input port 42, which in an embodiment, may include hardware components such as an input jack, and may be converted to a digital signal 44 by an A/D converter 46. In embodiments, the received signal 40 and the attenuated signal 26a may be converted to digital signals by a single A/D converter (e.g., a high-speed 14-bit converter) or by multiple A/D converters. The resulting digital received signal 44, also referred to as the primary input signal 44, is then input to a summer 48 and adaptive filter tap weight estimator 50. The digital attenuated signal 34, also referred to as the reference signal 34, is also input to estimator 50 and the digital adaptive filter 52. The tap weight estimator 50 may periodically provide tap weight values to digital filter 52. The digital filter 52 may provide an estimate of the transmitted signal that may be subtracted from the received signal with summer 48 to provide a cancelled signal 54.

The digital adaptive filter 52 and summer 48 are software-controlled and may include a backward adaptive filter tap estimator or a block forward tap estimator, in embodiments. In one embodiment, the adaptive filter/summer difference equation is given by the equation:

$$y(i) = r(i) - \sum_{k=0}^{M-1} a(k)t(i-k) \quad (1)$$

where y(i) are the output samples, r(i) are the receiver input port samples (also known as the primary input signal), t(i) are the transmitter input port samples (also known as the reference input signal), M is the length of the adaptive filter, and a(k) are the adaptive filter tap weights. The filter taps can be estimated by solution of the following matrix equation:

$$\begin{bmatrix} R_{tt}(0,0) & R_{tt}(0,1) & \ldots & R_{tt}(0, M-1) \\ R_{tt}(1,0) & R_{tt}(1,1) & \ldots & R_{tt}(1, M-1) \\ \ldots & \ldots & \ldots & \ldots \\ R_{tt}(M-1,0) & R_{tt}(1, M-1, 1) & \ldots & R_{tt}(M-1, M-1) \end{bmatrix} \quad (2)$$

$$\begin{bmatrix} a(0) \\ a(1) \\ \ldots \\ a(M-1) \end{bmatrix} = \begin{bmatrix} R_{tr}(0) \\ R_{tr}(1) \\ \ldots \\ R_{tr}(M-1) \end{bmatrix}$$

where $$R_{tt}(j,k) = \sum_{i=M-1}^{N-1} t(i-j)t(i-k) \quad (3)$$

and $$R_{tr}(k) = \sum_{i=M-1}^{N-1} r(i)t(i-k) \quad (4)$$

and where N is the length of the block of transmitter input port/receiver input port samples over which to estimate the filter taps.

Once the digital filter 52 provides an estimate of the transmitted signal that may be subtracted from the received signal using the summer 48, the resulting cancelled signal 54 may then be input to a software-controlled digital receiver 56 and may be further processed in any suitable manner. The cancelled signal 54 may be relatively clean from interferences resulting from transmitting and receiving signals over one frequency or channel. In an embodiment, the system 20 may include a bypass switch 58 for passing the signal 40 directly to the receiver 56 without being processed by the digital adaptive filter 52. For example, such an embodiment may be implemented if the signal 40 is degraded or corrupted to such an extent that digital cancellation may not be effective.

In some embodiments, a DFD system such as that illustrated in FIG. 2 may be implemented in one or more nodes 14 or houses 16 connected in a communication network 10. These nodes or houses, referred to as DFD enabled nodes, may enable devices 18 connected in the network 10 to transmit and receive signals without division duplex techniques (e.g., on the same frequency and at the same time) while reducing and/or eliminating the effects of signal interference which may result from oppositely propagating signals.

Figure 3:
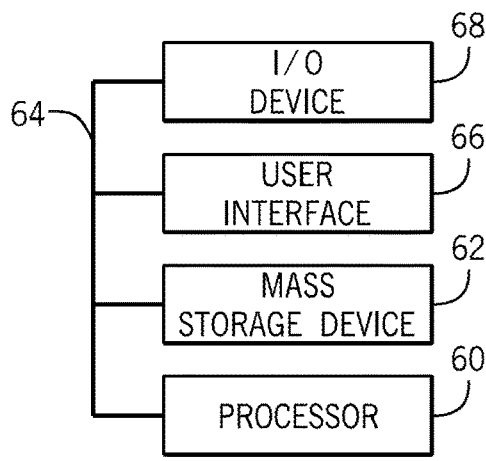
FIG. 3 is a block diagram of a hardware implementation of the system illustrated in FIG. 2, in accordance with embodiments of the present techniques.

FIG. 3 illustrates one embodiment of a hardware system intended to represent a broad category of computer systems such as personal computers, workstations, and/or embedded systems that may be used in conjunction with the present techniques. In some embodiments, the DFD system 22 may be coupled to such a hardware system and may include an external control having hardware and software components for implementing DFD techniques, including control of the individual components of the DFD system 22. In the embodiment illustrated in FIG. 3, hardware components of the DFD system 22 may include a processor 60 and mass storage device 62 coupled to high speed bus 64. A user interface device 66 may also be coupled to the bus 64. Examples of a suitable interface device 66 may include a display device, a keyboard, one or more external network interfaces, etc. An input/output device 68 may also be coupled to the bus 64. In an embodiment, the user interface device 66, for example the display, may communicate certain information related to the status of the operation of the adaptive filter 52 and/or the software-controlled digital receiver (FIG. 2). For example, the display may display information relating to the quality of the adaptive filter cancellation.

Certain embodiments may include additional components, may not require all of the above components, or may combine one or more components. For instance, the mass storage device 62 may be on-chip with processor 60. Additionally, the mass storage device 62 may include an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Additional components may include additional processors, a CD-ROM drive, additional memories, and other peripheral components.

Such DFD techniques in cable communication systems may address bandwidth concerns in cable networks. As transmitted and received signals may propagate over a single frequency and at substantially the same time over a coaxial cable 20, frequency-division and time-division duplexing techniques may not be necessary. The total number of frequency channels used by the connected houses 16 in a cable network 10 using DFD techniques may be significantly less (e.g., half) compared to the number of frequency channels used in a frequency-division cable network. Moreover, data rates in a DFD enabled network 10 may be significantly improved (e.g., by two times) compared to data rates in a network using time-division duplexing. In some embodiments, while DFD techniques may be used at the DFD system 22 of each house 16 and/or at the DFD system 22 of a network node 15, typical division duplexing techniques may still be used for multiple devices 18 at a house 16. For example, the multiple devices 18a and 18b in a DFD enabled house 16a may use time-division, frequency-division, and/or code-division duplexing techniques to transmit and receive data from the DFD system 22 connected to the coaxial cable port of the house 16a.

Implementing DFD techniques in cable communication systems may also address security concerns in cable networks. As signals transmitted from and received by each house 16 are oppositely propagating through a coaxial cable 20, the original signals transmitted from a house 16 or from a network node 15 may be more difficult to separate if the signals are intercepted. Furthermore, in some embodiments, the DFD systems 22 may be configured to encrypt and/or decrypt transmitted and/or received signals for increased security. For example, a cable company may use various encryption techniques with DFD systems 22 to protect the content of data transferred within the network 10. In such embodiments, the transmitter 28 in the DFD system 22 may include software suitable for encrypting the transmit signal 26 before outputting the transmit signal 26 to the cable 20. The software-controlled digital receiver 56 may also include software suitable for decrypting the cancelled signal 54 to determine the original information.

Figure 4:
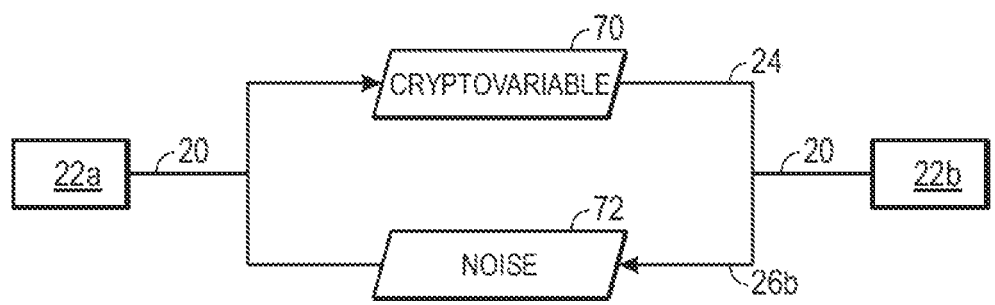
FIG. 4 is a schematic diagram representing the transmission of a cryptovariable in a division-free duplexing system, in accordance with embodiments of the present techniques.

For example, sending encrypted signals may involve initially sending a cryptovariable in one or both directions in a DFD communication. In one embodiment, as illustrated in FIG. 4, DFD techniques may be used for sending a cryptovariable 70 before communicating encrypted signals. A cryptovariable 70 may refer to an algorithm or key for performing encryption or decryption of transmitted or received signals. In some embodiments, the cryptovariable 70 may be transmitted from or received by a DFD enabled network node on either side of the communication. For example, either a DFD system 22 of a user (e.g., a DFD system 22 at a cable subscriber in house 16a) or a DFD system 22 at a network node 15 may transmit the cryptovariable 70 over the cable 20. The transmission of a cryptovariable 70 is represented in FIG. 4 as occurring between a first DFD system 22a and a second DFD system 22b.

In some embodiments, the first DFD system 22a may transmit a cryptovariable 70 to the second DFD system 22b. While the second DFD system 22b receives the cryptovariable 70, the second DFD system 22b may also transmit broadband noise 72 such that an interceptor may not easily uncover the cryptovariable 70 by intercepting the cable 20. Therefore, the transfer of the cryptovariable 70 and the noise 72 may be substantially bidirectional, simultaneous, and occurring over the same cable 20 between the two DFD systems 22a and 22b. Because the second DFD system 22b produces an attenuated version of the transmitted signal 26b (i.e., the noise 72), the second system 22b may use the attenuated signal (i.e., signal 26a in FIG. 2) to recover the cryptovariable 70 sent by the first DFD system 22a. Once the cryptovariable 70 is recovered, the second DFD system 22b may use the cryptovariable 70 to decrypt other encrypted signals received from the first DFD system 22a. In some embodiments, the processor 60 (FIG. 3) may be used to control the process of decrypting and/or encrypting signals.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
transmitting first data comprising a cryptovariable from a first device to a second device over a cable in a cable communication network, wherein the cryptovariable comprises an algorithm or key for performing encryption or decryption of transmitted or received signals;
receiving the first data comprising the cryptovariable at the second device;
transmitting second data from the second device over the cable, wherein transmitting the second data from the second device comprises transmitting broadband noise from the second device while the first device transmits the cryptovariable to the second device; and
removing the broadband noise from the first data received at the second device using a division-free duplexing (DFD) technique to recover the cryptovariable.

2. The method of claim 1, comprising one or more of:
transmitting first encrypted data in the first direction from the first device after transmitting the cryptovariable; and
transmitting second encrypted data in the second direction from the second device after receiving and recovering the cryptovariable.

3. The method of claim 2, comprising:
receiving the first encrypted data at the second device; and
decrypting the first encrypted data using the cryptovariable.

4. The method of claim 3, comprising: ceasing transmitting the broadband noise after recovering the cryptovariable.

5. The method of claim 1, comprising:
wherein removing the broadband noise from the first data received at the second device comprises using the second data transmitted from the second device as a reference signal.

6. The method of claim 1, wherein the DFD technique comprises:
receiving an analog primary signal from the cable;
receiving an analog reference signal from a transmitter;
converting the analog primary signal into a digital primary signal;
converting the analog reference signal into a digital reference signal; and
processing the digital reference signal with a digital adaptive filter, wherein the digital adaptive filter uses the digital reference signal and digital primary signal as inputs for determining filter weights of the digital adaptive filter to provide an output; and subtracting the output of the digital adaptive filter from the digital primary signal to generate a digital cancelled signal.

7. The method of claim 1, wherein the first data and the second data are transmitted over the same frequency channel.

8. A cable communication system, comprising:
a plurality of nodes each comprising a division-free duplexing (DFD) system configured such that one or more individual node of the plurality of nodes is configured to operate in a DFD mode, wherein a communication between two or more of the plurality of nodes is transmitted via a coaxial cable; and
one or more processors configured to control a mode of operation of individual nodes of the plurality of nodes, wherein the one or more individual nodes of the plurality of nodes that is configured to operate in the DFD mode is configured to receive a signal comprising a cryptovariable, transmit noise while receiving the cryptovariable, and use a DFD technique to recover the cryptovariable, wherein the cryptovariable comprises an algorithm or key for performing encryption or decryption of transmitted or received signals.

9. The cable communication system of claim 8, wherein the plurality of nodes comprises one or more network nodes coupled to one or more fiber rings.

10. The cable communication system of claim 8, wherein the cryptovariable comprises an algorithm.

11. The cable communication system of claim 8, wherein the cryptovariable comprises a key.

12. The cable communication system of claim 8, wherein the one or more processors are configured to control the transmission of the cryptovariable from one of the one or more nodes and the receiving of the cryptovariable at one or more other nodes of the plurality of nodes.

13. The cable communication system of claim 8, wherein each of the plurality of nodes is coupled to a user of the cable communication system.

14. The cable communication system of claim 8, wherein at least one node of the plurality of nodes comprises instructions for:
receiving a primary signal;
receiving a reference signal from a transmitter;
processing the reference signal with an adaptive filter, wherein the adaptive filter uses the reference signal and primary signal as inputs for determining filter weights of the adaptive filter to provide an output; and
subtracting the output of the adaptive filter from the primary signal to generate a cancelled signal comprising the cryptovariable.

15. The cable communication system of claim 8, wherein the processor is configured to operate a respective node of the plurality of nodes using the cryptovariable to decrypt data received at the respective node.

16. A division-free duplexing (DFD) system comprising:
a receiver capable of receiving an analog primary signal, wherein the analog primary signal comprises a cryptovariable;
a transmitter capable of transmitting an analog transmitted signal, wherein the analog transmitted signal comprises broadband noise;
a directional coupler capable of sampling a portion of the analog transmitted signal to provide an analog reference signal;
a first analog to digital converter capable of converting the analog primary signal into a digital primary signal;
a second analog to digital converter capable of converting the analog reference signal into a digital reference signal; and
a processor comprising instructions for:
processing the digital reference signal with an adaptive filter, wherein the adaptive filter uses the digital reference and primary signals as inputs for determining filter weights of the adaptive filter to provide an output;
subtracting the output of the adaptive filter from the digital primary signal to generate a digital cancelled signal; and
recovering the cryptovariable from the digital cancelled signal.

17. The DFD system of claim 16, wherein the DFD system is configured to be coupled to a network node in a cable communication network.

18. The DFD system of claim 16, wherein the DFD system is configured to be coupled to a user device of a cable communication network.

19. The DFD system of claim 16, wherein the transmitter is configured to transmit the analog transmitted signal to a coaxial cable on a same frequency from which the receiver receives the analog primary signal.

20. The DFD system of claim 16, wherein the processor further comprises instructions for using the recovered cryptovariable to decrypt encrypted signals received at the receiver.

21. The DFD system of claim 16, wherein the processor further comprises instructions for using the recovered cryptovariable to encrypt signal transmitted from the transmitter.

22. An apparatus, comprising:
a transmitter configured to generate and transmit data including broadband noise;
a receiver configured to receive the data comprising a cryptovariable while the transmitter is transmitting the broadband noise, wherein the cryptovariable comprises an algorithm or key for performing encryption or decryption of the transmitted or received data; and
a processor configured to remove the broadband noise from the data to recover the cryptovariable using a division free duplexing (DFD) technique.

23. The apparatus of claim 22, wherein the processor is configured to use the cryptovariable to encrypt second data and provide instruction to the transmitter to transmit the encrypted second data.

24. The apparatus of claim 22, wherein the processor is configured to use the cryptovariable to decrypt second data received by the receiver.

25. The apparatus of claim 22, wherein the processor is configured to provide instruction to the transmitter to stop transmitting the broadband noise when the cryptovariable is recovered.

26. The apparatus of claim 22, wherein the DFD technique comprises:
processing a digital reference signal derived from a sample of the transmitted broadband noise with an adaptive filter, wherein the adaptive filter uses the digital reference and a digital primary signal derived from the received data as inputs for determining filter weights of the adaptive filter to provide an output;
subtracting the output of the adaptive filter from the digital primary signal to generate a digital cancelled signal; and
recovering the cryptovariable from the digital cancelled signal.

27. The apparatus of claim 22, wherein the data and the broadband noise are at the same frequency.

28. An apparatus, comprising:
- a transmitter configured to transmit data including broadband noise and coupled to a coaxial cable in a cable network;
- a receiver configured to receive the data comprising a cryptovariable while the transmitter is transmitting the broadband noise, wherein the cryptovariable comprises an algorithm or key for performing encryption or decryption of the transmitted or received data; and
- a processor configured to remove the broadband noise from the data to recover the cryptovariable using a division free duplexing (DFD) technique.

* * * * *